United States Patent [19]
Lücke et al.
[11] Patent Number: 4,598,138
[45] Date of Patent: * Jul. 1, 1986

[54] STABLE, PHENOLIC MODIFIED HYDROCARBON RESINS FOR LEUCOPIGMENTS

[75] Inventors: Wolfgang Lücke, Oberhausen; Herbert Beneke, Castrop-Rauxel; Peter Stäglich, Duisburg, all of Fed. Rep. of Germany

[73] Assignee: Rütgerswerke Aktiengesellschaft, Frankfurt, Fed. Rep. of Germany

[ * ] Notice: The portion of the term of this patent subsequent to Sep. 11, 2001 has been disclaimed.

[21] Appl. No.: 548,693

[22] Filed: Nov. 15, 1983

[30] Foreign Application Priority Data

Dec. 16, 1982 [DE] Fed. Rep. of Germany ....... 3246539

[51] Int. Cl.[4] ........................ C08G 65/40; C08G 83/00

[52] U.S. Cl. .................................... 528/205; 525/534; 528/59; 528/60; 528/65; 528/75; 528/85

[58] Field of Search ..................... 528/205, 59, 60, 65, 528/75, 85; 525/534

[56] References Cited

U.S. PATENT DOCUMENTS

| | | | |
|---|---|---|---|
| 3,004,953 | 10/1961 | Sonnabend | 528/205 |
| 3,546,173 | 12/1970 | Hunt | 528/205 |
| 4,307,223 | 12/1981 | Shintani et al. | 528/205 |
| 4,357,459 | 11/1982 | Runavot et al. | 528/205 |
| 4,360,628 | 11/1982 | Runavot et al. | 528/205 |
| 4,471,106 | 9/1984 | Luecke et al. | 528/205 |

*Primary Examiner*—Lester L. Lee
*Attorney, Agent, or Firm*—Beveridge, DeGrandi & Weilacher

[57] ABSTRACT

Stable phenolic-modified hydrocarbon resins with an OH number which is 4.5 or greater are resonably priced and toxicologically generally regarded as safe resins for the development of leucopigments, especially for the development of colors in pressure sensitive recording materials. The softening point may be varied by copolymerization with multivalent phenolic compounds and vinyl phenol within the range of 70°-90° C.

13 Claims, No Drawings

STABLE, PHENOLIC MODIFIED HYDROCARBON RESINS FOR LEUCOPIGMENTS

The present invention relates to resins for the development of leucopigments, especially for the development of colors in pressure sensitive recording materials.

Pressure sensitive recording materials such as, for example, copy papers are coated foils or sheets with which one may produce copies without the use of a color insert such as, for example, carbon paper.

The recording which follows therefrom takes place by developing a color picture from a colorless organic compound dissolved in a high boiling, organic solvent which is capable of the formation of a color. This organic compound is designated as a leucopigment. The leucopigments commonly in use are crystal-violet lactone or malachite green lactone. In addition, however, other leucopigment compounds may also be used, such as but not limited to for example, leucauramine, acylauramine, basic unsaturated arylketones, basic monoazo-compunds, rhodamine-B-lactames, Michler hydrol, carbinoles of the crystal violet and malachite green or pyranes.

The color development takes place as a result of reaction of these leucopigments with an acidic acting developer substance during initimate contact of these reactants. Normally, the contact takes place as a result of the writing pressure on correspondingly coated foils but also, for example, in the case of thermocopying by locally limited heating action and the reaction of the leucopigment which is brought about thereby. These reactions are known in the art.

As developer substances, acid inorganic salts such as, for example, acid alumina or salts from strongly organic acids and weak bases, free organic acids or phenolic derivatives are known. These substances, have, in addition to a predominant tendency toward absorption of moisture leading to an unclear written image, the disadvantage that they must be fixed to the foils with the help of a binder. On the other hand, the direct use of acidic acting polymerizates as color developers is considered more advantageous. As such developer resins, one may preferably use phenolic containing polymers, such as phenol-aldehyde-condensation resins and phenolic polymerization resins.

Phenol-aldehyde-condensation resins have the disadvantage that the papers coated therewith on the one hand yellow easily and that in the case of recycling, there are toxicological considerations, because the danger of formaldehyde splitting off exists.

As phenolic polymerization resins, there are known for this purpose the expensive alkyl phenol acetylene resins produced by copolymerization of phenols with acetylene under pressure and at elevated temperature; i.e., under conditions which are not without problems, and di- and oligomeric alkenyl phenols.

Thus, in the German OS No. 26 47 696 and the German OS No. 27 03 574, dimeric substituted alkenyl phenols and in the European patent No. A-0029323, vinyl phenol oligomers are disclosed as color developers for leucopigments. Apart from the disadvantage that these products likewise are quite expensive, there exists in their case the difficulty that they have a relatively high softening point which moreover cannot be changed in the desired range.

From the European patent No. A-0029323, it is known to change the softening point of oligovinyl phenol by variation of the degree of polymerization, but even the unsubstituted dimer of the vinyl phenol has a softening point of 95° C., while higher polymerized vinyl phenol or else the dimers of the substituted vinyl phenols have a higher softening point. For pressure sensitive recording materials however, the softening point should lie in the range of 55° to 110° C., preferably however in the range of 70°-90° C., in order to have an optimal solution behavior in the solvent for the leucopigment and thereby obtain good color development. The disclosure of the two German published applications and the European patent are relied on and incorporated herein.

It is therefore the object of the present invention to provide a resin as reasonably priced as possible for the development of leucopigments, especially for the color development in pressure sensitive recording materials on the basis of a phenolic compound containing polymer which may be readily produced and handled and which causes no yellowing of the recording material and for which there would not be expected to be any toxicological problems in use or recycling, and the softening point of which lies in the range of 55°-110° C. (according to K.-S.) preferably however within the range of 70°-90° C. This object will be accomplished by resins and processes for their production according to the present invention.

It is therefore a feature of the invention to provide a resin for developing of leucopigments which is a stabilized, phenolic modified hydrocarbon resin with an OH number of at least 4.5. The preferred aspects of the invention reside in a resin as described which has a softening point in the range of 55°-110° C. and wherein wholly or partly multivalent phenolic compounds are used. In further detail, the resins of the invention are copolymerized with isobutene and vinyl phenol.

In carrying out the process feature of the invention, vinyl phenol, a phenolic compound, an unsaturated aromatic hydrocarbon and optionally isobutene are mixed together in the presence of a Friedel-Crafts catalyst. After reaching the selected polymerization temperature of 30° to 90° C., the reaction is guided isothermally, optionally with cooling to maintain the temperature.

Phenolic-modified hydrocarbon resins are frequently used polymers in the adhesive and lacquer industry, which are produced by polymerization of unsaturated aromatic hydrocarbons and phenol or substituted phenols with the use of Friedel-Crafts-catalysts.

They are less suitable as developer resins for leucopigments for their content of phenolic hydroxyl groups which is given with the value OH number is too low for a good color development. Whenever one tries to raise this OH number by increasing the portion of phenolic compound, when beginning with an OH number of about 3.5, the excess phenolic compound is no longer fixed. The resins become unstable which will be noted unpleasantly by a smell that arises from the free phenol.

Stable phenolic-modified hydrocarbon resins with a high OH number produced according to earlier applications (German Application P No. 31 28 869.3 and P No. 32 42 782.4) are very well suited as developer resins. The corresponding U.S. applications are Ser. No. 399,092 filed July 10, 1982 and now abandoned and Ser No. 548,908 filed Nov. 4, 1983, now U.S. Pat. No. 4,471,106. applications being relied on and incorporated herein by reference.

These stable phenolic-modified hydrocarbon resins are produced by polymerization of unsaturated, aromatic hydrocarbons, optionally isobutene, and phenol or substituted phenols with the use of Friedel-Crafts-cayatlysts, whereby a partial quantity of the unsaturated aromatic hydrocarbons and/or the entire quantity of phenols and of catalyst are introduced together and the polymerization is controlled by the addition of the remaining unsaturated aromatic hydrocarbons in such a way that, after reaching the selected polymerization temperature, which lies in the range from 70° to 140° C., it is conducted isothermally.

The ratio of phenol or phenol mixture to unsaturated aromatic compounds must be synchronized such that products of addition may be formed stoichiometrically with a corresponding OH number. For use according to the invention of these stable phenolic-modified hydrocarbon resins, an OH number of at least 4.5 is sufficient for a color development, however, the color development generally will be better, the higher the OH number.

As raw materials for the resins according to the invention, phenolic compounds, polymerizable unsaturated aromatic hydrocarbons and optionally isobutene may be used. As phenolic compounds, one may use mononuclear as well as polynuclear phenols, such as phenol itself, the alkyl substituted homologues, such as cresols or xylenols (lower alkyl substituted) as well as naphthols and in addition to that halogen-substituted phenols such as the chloro- or bromophenol and multivalent phenols such as resorcinol or pyrocatechol. Mixtures may also be used.

Preferably, technical phenolic fractions are used which are obtained from the distillation of crude phenols. They contain phenols, cresols, xylenols as well as possibly small portions of higher alkylated phenolics. The composition of these fractions varies depending on the selected boiling range.

Unsaturated aromatic hydrocarbons may be used on the one hand that are obtained in distillates from hard coal high temperature tar, boiling in the temperature range from 140° to about 220° C., and on the other hand unsaturated aromatic hydrocarbons may be used which are obtained during cracking of naphtha or gas oil as well as in the case of pyrolysis of cracking residues and are enriched in a fraction boiling in the range of 160°-220° C., the so-called resin oil fraction. These fractions contain unsaturated aromatic compounds, essentially indene, vinyl toluene, methylindene, coumarone, dicyclopentadiene, methyldicyclopentadiene, styrene and $\alpha$-methylstyrene in a concentration of 50 to 70% in addition to not reactive aromatic compounds. Mixtures of unsaturated aromatic hydrocarbons may also be used.

Quantitative ratios of phenols or phenol mixtures to unsaturated aromatic compounds range between 20:80 to 50:50% by weight.

Whenever these aromatic hydrocarbons are additionally polymerized jointy with isobutene, which at times is preferable for the improvement of the compatibility with non-polar solvents, then the quantitative ratios of the reaction components lie in the following ranges:

20-40% by weight of phenolic compounds
78-30% by weight of aromatic unsaturated hydrocarbons and
2-30% by weight of isobutene.

The quantities of phenolic compounds used will ensure that the resulting resins will have an OH number of at least 4.5. At the same time, it is possible to increase the OH number up to above 9 by use of multivalent phenols.

The polymerization of these unsaturated compounds take place generally with the help of acids or Friedel-Crafts-catalysts such as, for example, trichloroacetic acid, borotrifluoride-complexes, aluminum-, antimony V or tin-IV-chloride. These catalyst are known in the art and any suitable one may be chosen for purposes of this invention.

In order to carry out the polymerization, the catalyst and phenolic mixture are introduced. The phenolic component should be dissolved at this stage. It has been found that it is effective to use a portion of the hydrocarbon fraction as a solvent and thus to operate with a minimum of solvent. In the case of the use of such a solution, the polymerization reaction commences immediately and, by optionally cooling, must be kept within the temperature limits. After conclusion of this first polymerization step, the remaining resin oil fraction is added in such a way that the polymerization continues to run at a constant temperature.

Whenever the original reaction mixture does not initially contain unsaturated aromatic hydrocarbons, then the latter are added in doses in such a way that first of all a rise in temperature of the reaction mixture takes place towards the desired polymerization temperature and in that the temperature is kept constant for the further course of the polymerization.

These polymerization temperatures lie in the range of 30° to 70° C., whereby in the case of lower temperatures, on the one hand higher softening temperatures of the resins are achieved, on the other hand however, the duration of polymerization is also extended.

In the case of copolymerization with isobutene, the reaction temperature lies at a value in the range of 20°-140° C. This depends on the boiling point of the isobutene and the pressure prevailing during the reaction.

In order to carry out the polymerization, catalyst and phenol or a phenol mixture, preferably as a solution in aromatic solvents, and the unsaturated aromatic hydrocarbons and the isobutene are added gradually in doses according to the fixed ratio. This may take place as a result of the fact that the unsaturated aromatic hydrocarbons and isobutene are mixed in a cooled state and are maintained at a temperature below the boiling point of the mixture and in that this mixture is added by doses while cooling and in portions to the phenolic compounds. The reaction may then be carried out under standard pressure. However, it is also possible to add the aromatic unsaturated hydrocarbons and the isobutene uncooled in the predetermined ratio separately to the mixture of phenolic compounds and the catalyst. At the same time, the gaseous isobutene under a pressure of up to 6 bar is forced into the reaction vessel and the reaction is carried out under a pressure of up to 4 bar. The neutralization of the catalyst and the further processing of the resin take place according to the processes known in the art.

In the case of an optimal polymerization which is given as a result of a low polymerization temperature and as a result of a 1 to 2 hour after-reaction at this temperature, it is possible to produce stable, phenolic-modified hydrocarbon resins with OH numbers of at least 4.5 and softening points up to 65° C. with monovalent phenols.

Whenever wholly or partly monovalent phenols such as pyrocatechol or resorcinol are used as phenolic compounds, then stable resins with OH numbers up to about 10 will result. It was found that these resins have softening points of 65° to 80° C.

The softening points are limited for a developer resin for pressure sensitive recording materials insofar to a relatively narrow range of temperature, as experience has shown, that products with a softening point of more than 110° C. generally do not bring about any color development. Apparently, such resins are not sufficiently solubilized by the solution of the leucopigment for a color producing reaction. From this it follows, that for this reaction, a resin would be desirable with as low as possible softening point. On the other hand, the resin must not adhere at ambient temperature and, which is important above all in the case of paper as a carrier material, it must remain on the carrier material as a layer and must not be drawn into said paper. Because of these considerations, the softening point must be as high as possible. As a result of these limiting parameters, there results for the softening point of the resins a desired workable range of 55° to 110° C. and a preferred range for copying paper of 70° to 90° C.

The use of multivalent phenols in the case of production of the phenolic-modified hydrocarbons according to the invention will permit consequently to adjust the softening points of the resin in the optimal temperature range for copying papers and at the same time at least to improve the developer characteristics.

Another possibility of increasing the softening point of the phenolic-modified hydrocarbon resins and even to adjust it almost at will within the stated range is offered by the copolymerization with vinyl phenol or with a halogen-alkyl- or aralkyl-substituted vinyl phenol in the core in the alkene chain.

Surprisingly, it was found that vinyl phenols copolymerize with unsaturated aromatic compounds and phenolic compounds. On the basis of the extraordinary reactivity of the vinyl phenols, it was to be expected that the relatively reactively inert unsaturated aromatic compounds and the phenols which do not polymerize at all but participate only as a result of an alkylation reaction, do not participate in the reaction. There results however a genuine copolymerization which produces a unified resin.

Depending on the desired softening point, the quantities of vinyl phenol range from 10 to 30% of the components to be polymerized, wherein one replaces about 10 to 70% of the phenolic content with vinyl phenol. To be sure, it would also be possible to replace the entire phenolic compounds by vinyl phenols, however, this is not desirable for economic reasons and moreover results in resins with too high a softening point.

The polymerization reaction likewise takes place as a result of isothermal polymerization in such a way that vinyl phenol, the phenolic compounds, the unsaturated aromatic hydrocarbons and optionally the isobutene are mixed with one another and are reacted with a Friedel-Crafts-catalyst. The polymerization reaction will be guided isothermally, optionally with exterior cooling, after reaching the selected polymerization temperature which lies within the range of 30°-90° C.

After the ending of the reaction and for completion of the polymerization reaction, one may reheat after 15-30 minutes. After that, the catalyst is removed by washing out or precipitation and filtration, and the resin is freed by distillation at standard pressure or in the vacuum and subsequent steam distillation of unpolymerized components.

The resins obtained are nearly colorless, not yellowing, odorless products with softening points which lie, depending on the composition in the range from 70°-110° C. In the case of reaction with a leucopigment, a color development is produced with resins having an OH number beginning with 4.5 which development is very good for a pressure sensitive copying paper.

The invention will be explained further on the basis of the following examples. In all instances, percentage data are percent by weight. The softening points (S.P.) are determined according to the method of Kraemer-Sarnow. The OH number is determined by acetylation with subsequent saponification with determination of the quantities of a KOH-solution of a known factor needed for this purpose. Analysis techniques are known in the art.

EXAMPLE 1

As a result of isothermal polymerization at 35° C. of a composition made of a batch of:

| | |
|---|---|
| 150 g | of phenolic fraction with a content of 48% of phenol and 16% of cresolene and 36% of xylenolene |
| 50 g | of toluene |
| 5.4 g | of $BF_3$ methyl etherate |
| 350 g | of resin oil fraction with a boiling range of 160-220° C. (indene content 63%) |

a light colored, not yellowing, nearly odorless resin is obtained with an SP of 55° C. and an OH number of 6.4 (yield 73% of the polymerizable portions).

Printing Test 10 g of resin are dissolved in 100 ml of toluene (ethyl acetate). One side of a sheet of commercial typewriter paper is moistened with this solution and subsequently the solvent is evaporated. The paper prepared in that way corresponds to the copying page of a pressure sensitive copying paper system. It is placed on a cover sheet of a commercial copying paper system which is coated with one or more leucopigments and a high boiling, solid, organic solvent in a microencapsulated state and put on in such a way that the two coated pages lie on top of one another. The copying system produced in that way is typed on with a standard typewriter in the customary manner.

After 10 seconds, the development of the printing on the copy sheet is evaluated. The evaluation takes place according to the following categories:

| | |
|---|---|
| very good | full color development |
| good | the printing is quite legible |
| sufficient | after 10 seconds, the printing is barely legible, the color deepens within one minute |
| not sufficient | no legible printed image is developed |

The printing development achieved with the produced developer resin is good.

EXAMPLE 2

As a result of isothermal polymerization at 25° C. of a batch of:

| | |
|---|---|
| 150 g | of phenolic fraction according to Example 1 |
| 50 g | of toluene |
| 5.4 g | of $BF_3$ methyl etherate |
| 320 g | of resin oil fraction (boiling range 160–220° C.) |
| 18 g | of isobutene |

a light colored, almost odorless resin is obtained with an SP of 60° C. and an OH number of 5.9.

During a printing test analogously to Example 1, a good printing development resulted.

EXAMPLE 3

By isothermal polymerization at 40° C. of a batch consisting of:

| | |
|---|---|
| 3630 g | of phenolic fraction according to Example 1 |
| 80.6 g | of $BF_3$ methyl etherate |
| 3000 g | of resin oil fraction/boiling range 160–220° C. |
| 1090 g | of isobutene |

a light colored, not yellowing, nearly odorless resin with an SP of 60° C. and an OH number of 5.8 is obtained. In a printing test analogous to Example 1, a sufficient printing development resulted.

EXAMPLE 4

As a result of isothermal polymerization at 40° C. of a batch consisting of:

| | |
|---|---|
| 75 g | of phenol |
| 25 g | of toluene |
| 2.7 g | of $BF_3$ ethyl etherate |
| 80 g | of divinyl benzol |
| 100 g | of resin oil fraction with 53% vinyl toluene content (boiling range 160–172° C.) |

a light colored, not yellowing, nearly odorless resin with an SP of 57° C. and an OH number of 5.8 is obtained. In a printing test analogous to Example 1, there resulted a sufficient printing development.

EXAMPLE 5

As a result of isothermal polymerization at 60° C. of a batch consisting of:

| | |
|---|---|
| 40 g | of resorcin |
| 350 g | of toluene |
| 3.1 g | of $BF_3$ methyletherate |
| 240 g | of resin oil fraction (boiling range 160–220° C.) |

a light colored, not yellowing, nearly odorless resin with an SP of 67° C. and an OH number of 9.3 is obtained. (Yield 35% of the polymerizable portions). In printing test conducted analogously to Example 1, a very good printing development resulted.

EXAMPLE 6

As a result of isothermal polymerization at 60° C. of a batch consisting of:

| | |
|---|---|
| 40 g | of pyrocatechol |
| 280 g | of toluene |
| 3.1 g | of $BF_3$ methyletherate |
| 240 g | of resin oil fraction (boiling range 160–220° C.) |

there is obtained a light colored, not yellowing, almost odorless resin with an SP of 72° C. and an OH number of 7.1 (yield 79% of the polymerizable portions). In the printing test conducted analogously to Example 1, a good printing development resulted.

EXAMPLE 7

By isothermal polymerization at 60° C. of a batch consisting of:

| | |
|---|---|
| 200 g | of phenol |
| 300 g | of p-vinyl phenol |
| 15 g | of $BF_3$ methyletherate |
| 787 g | of resin oil fraction (boiling range 160–220° C.) |

a light colored, not yellowing, nearly odorless resin with an SP of 80° C. and an OH number of 4.9 is obtained. In a printing test conducted analogously to Example 1, a very good printing development resulted.

EXAMPLE 8

By isothermal polymerization at 80° C. of a batch consisting of:

| | |
|---|---|
| 160 g | of phenol |
| 220 g | of p-vinyl phenol |
| 15 g | of $BF_3$ methyletherate |
| 976 g | of resin oil fraction (boiling range 160–220° C.) |

a light colored, not yellowing, nearly odorless resin with an SP of 70° C. and an OH number of 4.5 is obtained. In a printing test conducted analogously to Example 1, a very good printing development resulted.

COMPARATIVE EXAMPLE

A polyviny phenol resin with an SP of 185° C. and an OH number of 14 produced by polymerization of p-vinyl phenol when subjected to the printing test conducted analogously to Example 1, showed no developer characteristics.

The entire content of the German priority application P No. 32 46 539.4 is relied on and incorporated herein.

Further modifications and variations of the foregoing invention will be apparent to those skilled in the art from the foregoing description and are intended to be encompassed by the claims appended hereto.

We claim:

1. A resin for developing of leucopigments which is a stable, phenolic-modified hydrocarbon resin with an OH number of at least 4.5.

2. The resin as in claim 1, having a softening point in the range of 55°–110° C.

3. The resin as in claim 1, further comprising wherein the phenolic portion is resorcinol or a blend of phenol and resorcinol.

4. The resin as in claim 1, produced by copolymerization with isobutene.

5. The resin as in claim 1, produced by copolymerization with vinyl phenol.

6. The resin as in claim 1, further comprising a phenolic compound selected from mononuclear and polynuclear phenols and an unsaturated aromatic hydrocarbon as components of said resin.

7. The resin as in claim 6, further comprising a ratio of 20:80 to 50:50 by weight phenolic component to hydrocarbon component.

8. The resin as in claim 1, further comprising 20–40% of phenolic compounds, 78–30% by weight aromatic unsaturated hydrocarbon and 2–30% by weight of isobutene.

9. A process for the production of a resin which is a stabilized, phenolic-modified hydrocarbon resin with an OH number of at least 4.5, comprising mixing vinyl phenol, a phenolic compound, and an unsaturated aromatic hydrocarbon with one another and treating with a Friedel-Crafts-catalyst, permitting the polymerization reaction to proceed isothermally after reaching the selected polymerization temperature in the range of 30° to 90° C.

10. The process of claim 9, further comprising isobutene added to the polymerization reaction.

11. The process of claim 9, further comprising cooling of the polymerization reaction in order to maintain the isothermal polymerization temperature.

12. A resin as in claim 1, further comprising vinyl phenol as the component of said resin.

13. A stable phenolic modified hydrocarbon resin with an OH number of at least 4.5 having been produced by the process of claim 9.

* * * * *